United States Patent [19]

Brown et al.

[11] Patent Number: 5,539,062

[45] Date of Patent: Jul. 23, 1996

[54] COMPOSITIONS OF POLY(PHENYLENE ETHER) RESINS AND NAPHTHALATE POLYESTER RESINS

[75] Inventors: Sterling B. Brown, Schenectady, N.Y.; Chorng-Fure R. Hwang, Cary, N.C.; Steven T. Rice, Scotia, N.Y.; James J. Scobbo, Jr., Slingerlands, N.Y.; John B. Yates, Glenmont, N.Y.

[73] Assignee: General Electric Company, Pittsfield, Mass.

[21] Appl. No.: 474,823

[22] Filed: Jun. 7, 1995

[51] Int. Cl.$^6$ ............... C08G 65/48; C08L 71/12
[52] U.S. Cl. ............... 525/397; 525/396; 525/437; 525/440; 525/449; 525/905; 524/81
[58] Field of Search ............... 525/437, 448, 525/449, 396, 397, 905; 524/81

[56] References Cited

U.S. PATENT DOCUMENTS

| | | | |
|---|---|---|---|
| 4,315,086 | 2/1982 | Ueno et al. | 525/391 |
| 4,386,174 | 5/1983 | Cogswell et al. | 524/27 |
| 4,664,972 | 5/1987 | Connolly | 428/290 |
| 4,732,937 | 3/1988 | Sybert | 529/92 |
| 4,732,938 | 3/1988 | Grant et al. | 525/92 |
| 4,845,160 | 7/1989 | Sybert | 525/391 |
| 4,873,286 | 10/1989 | Gallucci et al. | 525/92 |
| 4,994,531 | 2/1991 | Brown et al. | 525/391 |
| 5,010,144 | 4/1991 | Phanstiel, IV et al. | 525/397 |
| 5,089,566 | 2/1992 | Brown et al. | 525/396 |
| 5,096,979 | 3/1992 | Brown et al. | 525/396 |
| 5,098,567 | 2/1992 | Phanstiel et al. | 525/397 |
| 5,110,896 | 5/1992 | Waggoner et al. | 528/190 |
| 5,132,361 | 7/1992 | Shea et al. | 525/66 |
| 5,132,373 | 7/1992 | Khouri et al. | 525/390 |
| 5,153,267 | 10/1992 | Brown et al. | 525/92 |
| 5,153,290 | 10/1992 | Khouri et al. | 526/266 |
| 5,210,191 | 5/1993 | Phanstiel et al. | 544/214 |
| 5,212,255 | 5/1993 | Khouri et al. | 525/391 |
| 5,214,099 | 5/1993 | Khouri et al. | 525/149 |
| 5,247,006 | 9/1993 | Khouri et al. | 524/508 |
| 5,420,184 | 5/1995 | Tsukahara et al. | 524/120 |

FOREIGN PATENT DOCUMENTS

| | | |
|---|---|---|
| 0438128A2 | 1/1991 | European Pat. Off. . |
| 06041400A | 7/1992 | Japan . |
| 04202461A | 7/1992 | Japan . |
| 04202462A | 7/1992 | Japan . |
| 05086266A | 4/1993 | Japan . |
| 05117505A | 5/1993 | Japan . |

Primary Examiner—Samuel A. Acquah

[57] ABSTRACT

Compositions are provided for comprising a compatibilizing PPE and a naphthalate-type polyester resin wherein the compositions have a drop in the elastic modulus occurring at least about 15° C. higher than the corresponding blend wherein the polyester does not contain a substantial portion of naphthalate moieties. The compositions can further comprise impact modifiers, reinforcing agents, fillers, stabilizers, antistatic agents, plasticizers, lubricants, and other additives to provide compositions with enhanced physical properties. Articles molded from these compositions are useful in the automotive industry.

14 Claims, 3 Drawing Sheets

COMPOSITIONS OF POLY(PHENYLENE ETHER) RESINS AND NAPHTHALATE POLYESTER RESINS

BACKGROUND OF THE INVENTION

1. Field of the Invention

This invention relates to blends of poly(phenylene ether) resins and thermoplastic naphthalate-type polyesters that exhibit enhanced properties, such as increased elastic modulii.

2. Brief Description of the Related Art

Poly(phenylene ether) resins (referred to hereafter as "PPE") are commercially attractive materials because of their unique combination of properties, including, for example, high temperature resistance, dimensional and hydrolytic stability, and electrical properties. Furthermore, the combination of PPE with polyesters into compatibilized PPE-polyester blends has been sought after for additional overall properties such as, for example, chemical resistance, high strength, and high flow. Examples of such compatibilized blends can be found in U.S. Pat. Nos. 4,845,160, 5,089,566, 5,153,267, 5,247,006, 5,010,144 and 5,089,567, which are incorporated herein by reference. The properties of these blends can be further enhanced by the addition of various additives such as impact modifiers, heat stabilizers, antioxidants and fillers. The physical properties of compatibilized blends comprising PPE and polyesters make them attractive for a variety of end-use articles in the automotive market, especially for lighting and under hood components.

All of the aforementioned examples of compatibilized PPE-polyester blends have utilized terephthalate diacid type polyesters such as poly(1,4-butylene terephthalate) and poly(1,2-ethylene terephthalate) or various derivatives thereof for the polyester component. A disadvantage of these terephthalate diacid type polyesters is their relatively low Tg's (PBT Tg is about 45°–50° C. and PET Tg is about 70°–75° C.). The relatively low Tg's of the terephthalate-type polyesters result in PPE-polyester blends with somewhat limited high heat capabilities for certain demanding high temperature applications. Included in these demanding applications are the aforementioned lighting and under hood components.

It is therefore apparent that a need continues to exist for alternative strategies for PPE-polyester blends which overcome some of the aforementioned difficulties.

SUMMARY OF THE INVENTION

The needs discussed above have been satisfied by the surprising discovery of an improved thermoplastic composition which comprises:

(a) a poly(phenylene ether) resin, and (b) a polyester resin of the formula wherein each $R^1$ is independently a divalent aliphatic, alicyclic, or aromatic hydrocarbon or polyoxyalkylene radical, or mixtures thereof and each $A^1$ is independently a divalent aliphatic, alicyclic or aromatic radical, or mixtures thereof; with the proviso that a substantial portion of the $A^1$ moieties are naphthalate radicals. The compositions may further comprise a compatibilizing poly(phenylene ether) resin.

In preferred embodiments, the present invention provides compatibilized PPE-polyester compositions with increased elastic modulii and improved heat resistance. In additional preferred embodiments, the present invention also provides compatibilized PPE-polyester compositions free of visual signs of lamination, having improved phase morphology stabilization and possessing good impact and tensile properties. The description which follows provides further details regarding this invention.

DETAILED DESCRIPTION OF THE INVENTION

The poly(phenylene ether) resins employed in the present invention are known polymers comprising a plurality of structural units of the formula (I):

wherein each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

For one embodiment of the present invention, it is essential for at least some of the PPE to contain at least one reactive functional group, which may be present on a polymer endgroup or along the backbone of the polymer chain. These PPE which contain at least one reactive functional group are generally referred to as compatibilizing PPE or functionalized PPE.

One type of useful reactive functional group for the compatibilizing PPE is epoxy. A useful method for preparing an epoxy functionalized PPE involves reacting PPE with an unsaturated epoxy species such as, for example, glycidyl acrylate and glycidyl methacrylate. Methods to prepare epoxy functionalized PPE from unsaturated epoxy species can be found in U.S. Pat. Nos. 4,994,531 and 5,214,099, both of which are incorporated herein by reference. Another useful method for preparing an appropriate epoxy-type compatibilizing PPE involves reacting PPE with various epoxy chlorotriazine compounds in a non-reactive solvent for PPE. The capped PPE may be isolated by conventional techniques, such as precipitation with a non-solvent. Non-limiting examples of these compounds include 2-chloro-4, 6-diglycidoxy-1,3,5-triazine; 2-chloro-4-(n-butoxy)-6-glycidoxy-1,3,5-triazine; and 2-chloro-4-(2,4,6-trimethylphenoxy)-6-glycidoxy-1,3,5-triazine, also known as mesityl glycidyl chlorocyanurate (MGCC). Methods to prepare these compounds and functionalized PPE resins can be found in U.S. Pat. Nos. 4,895,945, 5,041,504, 5,089,566, 5,096,979, and 5,132,373; all of which are incorporated herein by reference.

Another PPE useful for the present invention is orthoester functional PPE. The term "orthoester" is meant to refer to a compound in which one carbon atom is attached to another by a direct carbon-carbon bond, and to three further carbon atoms through oxygen. Such compounds can be considered to be esters of the hypothetical orthoacids R—C(OH)$_3$, wherein R is an organic radical. The existence of such orthoacids is for the most part unknown, since they immediately dehydrate to conventional carboxylic acids. However, esters of such acids are known and the compositions of this invention include certain polymer substituted esters of this type.

The orthoester functional PPE preferably contain orthoester moieties represented by the formula (II):

wherein $R^{15}$ is a $C_{1-4}$ primary or secondary alkyl radical or is an alkylene radical forming a second 5- or 6-membered ring with C*, and $R^{14}$ is a $C_{1-4}$ primary or secondary alkyl or $C_{6-10}$ aromatic radical, or $R^{14}$ and $R^{15}$ together with the atoms connecting them form a 5-, 6- or 7-membered ring; $R^{16}$ is hydrogen or $C_{1-4}$ primary or secondary alkyl; K is 0 or 1; J is from 1 or 2; and p is 0 when $R^{15}$ and C* form a ring and is otherwise 1.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred.

It is also possible for $R^{15}$ to form a second 5- or 6-membered ring with other portions of the molecule. For this purpose, one of the carbon atoms in the orthoester ring is designated C* to indicate its role as part of said second ring.

The $R^{14}$ value may be a $C_{1-4}$ primary or secondary alkyl radical as defined above for $R^{15}$ or a $C_{6-10}$ aromatic (preferably aromatic hydrocarbon) radical. Finally, it is possible for $R^{14}$ and $R^{15}$ together to form a 5-, 6- or 7-membered ring with the atoms connecting them. Thus, the invention includes certain spiro orthoester-functionalized PPE.

The $R^{16}$ radical may be hydrogen or an alkyl radical similar to $R^{14}$ and $R^{15}$. It is preferably hydrogen.

The values of J and K depend on whether the cyclic orthoester moiety is a 5-membered or 6-membered ring. In general, 5-membered rings are preferred; that is, K is 0 and J is 1. However, the invention also includes compositions in which a 6-membered ring is present, which requires either that J and K both be 1 or that K be 0 and J be 2.

The value of the subscript p also depends on the cyclic structure of the orthoester moiety. If C* is part of a ring structure with $R^{15}$, all four valences thereof are satisfied and p will be 0. If this is not the case, p will be 1.

The following is an illustrative orthoester moiety (III) which may be present in the orthoester functional PPE:

and which may also be referred to as a 4-(2-methoxy-2-methyl-1,3-dioxolanyl) radical and is usually preferred. Intermediates for preparation of such compounds include 4-hydroxymethyl-2-methoxy-2-methyl-1,3-dioxolane, which is obtainable by the reaction of glycerol and methyl orthoacetate. An improved method for the preparation of this and structurally related compounds in substantially pure form and the products thus obtained are disclosed in U.S. Pat. No. 5,231,197, which is incorporated herein by reference.

The PPE having orthoester functional moieties is preferably prepared by melt extrusion of PPE with at least one graftable ethylenically unsaturated orthoester monomer. The functional orthoester monomer may be represented by the general formula (IV):

wherein the $R^{14}$, $R^{15}$, $R^{16}$, J, K, p and C* are as previously defined, $R^{13}$ is a $C_{1-6}$ alkylene radical and W is a graftable unsaturated group represented by the following formula (V)

wherein each $R^{11}$ may independently be hydrogen, or a $C_{1-8}$ radical, or substituted derivatives thereof; or an aryl radical, or substituted derivative thereof. Each $R^{11}$ can also be other groups, provided that the group is inert to the orthoester. The value of m may be 1 or greater. $R^{12}$ can be one of the following formulae (VI):

Illustrative examples of monomers which may be employed in the present invention include 4-acryloyloxymethyl-2-methoxy-2-methyl-1,3-dioxolane, 4-methacryloyloxymethhyl-2-methoxy-2-methyl-1,3-dioxolane, 4-acryloyloxymethyl-2-methoxy-2-phenyl-1,3-dioxolane and the isomeric mixture of 4-(2-methoxy-2-methyl-1,3-dioxolanyl-)methyl vinylbenzyl ethers. Methods for the preparation of these materials and their reaction with PPE can be found in U.S. Pat. Nos. 5,171,866, 5,153,290, and 5,212,255, all of which are incorporated herein by reference.

Preferably the vinyl functional orthoester monomer is of the formula (VII):

Another preferred vinyl functional orthoester monomer is represented by the formula (VIII):

It is sometimes advantageous to use an initiator in the preparation of the functionalized PPE with the olefinic compound. Suitable initiators for use in the current invention include free radical initiators generally known to the art. Specific initiators include various peroxides and hydroperoxides. Specific examples include benzoyl peroxide, dicumyl peroxide, 2,5-dimethyl-2,5-di(t-butylperoxy)hexyne-3 and cumene peroxide, with 2,5,-dimethyl-2,5-di(t-butylperoxy)hexyne-3 being preferred. When it is used, the amount of initiator used can vary from about 0.05 weight percent to about 0.5 weight percent relative to the weight of the PPE.

Ortho ester derivatives of chlorotriazine compounds, as previously noted for epoxy groups, are also useful including 2-chloro-4-(2-methoxy-2-methyl-1,3-dioxolanyl)methoxy-6-phenoxy-1,3,5-triazine, for example. References to prepare appropriate triazine compounds can be found in U.S. Pat. No. 5,132,373, which is incorporated herein by reference.

The amount of the above mentioned functionalizing agent that is required to appropriately functionalize the PPE is that which is sufficient to improve the compatibility between the various components in the composition. An effective amount, based on the amount of the PPE, is generally up to about 8% by weight, and is preferably from about 0.05% to about 4% by weight. In the most preferred embodiments, the amount of the functionalizing agent is in the range from about 0.1% to about 3% by weight based on the amount of the PPE.

It is also sometimes advantageous to employ at least one lubricant which is substantially inert to the functionalizing agent and other ingredients in the preparation of a functionalized PPE. The presence of the lubricant decreases the required melt processing temperature to produce the functionalized PPE, as well as the compatibilized blends prepared therefrom. As a result, gel formation is minimized.

The hydrogenated poly($\alpha$-olefins) are often the preferred lubricants. They may be obtained by the catalytic polymerization of $\alpha$-olefins followed by hydrogenation to remove residual unsaturation. The catalysts which may be employed in their preparation include cationic and metathetic catalysts. Methods for preparing hydrogenated poly($\alpha$-olefins) are disclosed, for example, in U.S. Pat. Nos. 4,225,739, 4,282, 392, 4,311,864, 4,319,065, 4,334,113 and 4,409,415, all of which are incorporated herein by reference. The products comprise polymers of various molecular weights, including oligomers.

The most preferred hydrogenated poly($\alpha$-olefins) are those having kinematic viscosities of about 2–20 centistokes and especially 8–12 centistokes at 100° C., as determined by ASTM procedure D445. They are commercially available from such companies as Henkel Corporation under the tradename EMERY fluids.

The hydrogenated poly($\alpha$-olefins) are generally used in a lubricating amount. The lubricating amount, based on the weight of the PPE, is generally in the range of about 1% to about 5% by weight and preferably about 2% to about 4 % by weight.

Polyesters suitable for use as Component B of the present compositions include those comprising structural units of the formula (IX):

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof; with the proviso that a substantial proportion of the $A^1$ moieties are naphthalate radicals. Substantial proportion means an amount sufficient to increase the glass transition temperature (Tg) and the melting point (Tin) of the polymer over the same polymer wherein $A^1$ is not a naphthalate radical. Generally, the naphthalate radical is at least 50 mole percent of the $A^1$ radicals, preferably the naphthalate radical is at least 75 mole percent of the $A^1$ radicals, and most preferably, the naphthalate radical is at least 90 mole percent of the $A^1$ radicals. Examples of suitable polyesters containing the structure of formula (IX) are poly(alkylene dicarboxylates), elastomeric polyesters, liquid crystalline polyesters, polyarylates, and polyester copolymers such as copolyestercarbonates and copolyesteramides.

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The A¹ radical in the above formula (IX) is preferably a 2,6-naphthalate or a mixture thereof with, for example, p- or m-phenylene. This class of polyesters includes the poly(alkylene naphthalates), for example, poly(1,2-ethylene-2,6-naphthalate) resin, poly(1,4-butylene-2,6-naphthalate) resin, and poly(1,4-cyclohexanedimethanol-2,6-naphthalate)resin.

Also included are polyesters that have been treated with relatively low levels of diepoxy or multi-epoxy compounds. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

It is preferred for at least some of the polyester to contain nucleophilic groups such as, for example, carboxylic acid groups. In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

Suitable polyesters for the present invention include poly(alkylene naphthalate)s such as, for example, poly(alkylene-2,6-naphthalate)s including poly(butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, naphthalate dicarboxylic acids or phthalate dicarboxylic acids, and aromatic hydroxy carboxylic acids are also useful. Various mixtures of polyesters are also sometimes very suitable.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

The invention also includes compositions containing elastomeric impact modifiers compatible with either or both the PPE and the polyester.

Impact modifiers for PPE and polyester are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may be functionalized or may not be functionalized.

Olefin polymers and copolymers employable in the invention include low density polyethylene (LDPE), high density polyethylene (HDPE), linear low density polyethylene (LLDPE), isotactic polypropylene, poly(1-butene), poly(4-methyl-1-pentene), and the like. Additional olefin copolymers include copolymers of one or more olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

One type of olefinic elastomer useful in the present invention are copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-saturated acids are compounds of the general formula (X):

wherein $R^{35}$ represents a hydrogen atom or a lower alkyl group. Examples of the glycidyl esters of α,β-unsaturated acids include glycidyl acrylate, glycidyl methacrylate and glycidyl ethacrylate. The epoxy functional olefinic elastomer is preferably an olefinic copolymer containing from about 60% to about 99.5% by weight of an α-olefin and from about 0.5% to about 40% by weight of a glycidyl ester of an unsaturated carboxylic acid, preferably from about 3% to about 30% by weight; based on the weight of the elastomer's composition. When this amount is less than about 0.5% by weight, no intended effects, such as improved ductility, can be obtained and when it exceeds about 40% by weight, gelation occurs during melt-blending resulting in degradation of the extrusion stability, moldability and mechanical properties of the product. Suitable epoxy functional α-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are available from Sumitomo Chemical Co. under the trademarks IGETABOND and BONDFAST and from Elf Atochem under the trademark LOTADER.

A particularly useful class of impact modifiers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include, e.g., polystyrene-polybutadiene (SBR), polystyrene-poly(ethylene propylene) (S-EP), polystyrene-polyisoprene and poly(alpha-methylstyrene)-polybutadiene. Such AB block copolymers are available commercially from a number of sources, including Phillips Petroleum under the trademark SOLPRENE, and from the Shell Chemical Co. under the trademark KRATON, and from Kuraray under the tradename SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include, e.g., polystyrene-polybutadiene-polystyrene (SBS), polystyrene-polyisoprene-polystyrene (SIS), polystyrene-poly(ethylene propylene)-polystyrene (S-EP-S), polystyrene-poly(ethylene butylene)-polystyrene (S-EB-S), poly(alpha-methyl-styrene)-polybutadiene-poly(alpha-methylstyrene) and poly(alpha-methylstyrene)-polyisoprene-poly(alpha-methylstyrene). Particularly preferred triblock copolymers are available commercially from Shell Chemical Co. under the trademarks CARIFLEX and KRATON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, ortho-ester, epoxy, amine, or anhydride. Many EPDM's and processes for the production thereof are disclosed in U.S. Pat. Nos. 2,933,480, 3,000,866, 3,407,158, 3,093,621 and 3,379,701, which are all incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, ortho-ester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, thermoplastic polyester elastomers and thermoplastic poly(ether-ester) and poly(ester-amide) elastomers.

The proportion of impact modifier or other resinous material is subject to wide variation. The amount of impact modifier used is generally an amount sufficient to improve the ductility of the compositions. Impact modifiers such as diblock or triblock copolymers, when utilized, are usually present in an amount up to about 50 parts per 100 parts of PPE. The epoxy functional olefinic elastomers, when utilized as an impact modifier, are usually present in an amount up to about 50 parts per 100 parts of polyester resins. Other impact modifiers may also be present.

The compositions of the present invention may also contain at least one nonelastomeric polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XI):

wherein $R^8$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, when one is used, is an amount effective to improve the flow of the composition. Improved flow can be indicated by reduced viscosity or reduced injection pressures needed to fill a part during an injection molding process. Generally, the nonelastomeric alkenylaromatic compound is utilized in the range of about 1% to about 20% by weight based on the total weight of the composition. The preferred range is about 3% to about 15% by weight and the most preferred range is about 5% to about 12% by weight; based on the total weight of the composition.

In addition to optionally containing impact modifiers, compositions of the present invention can also include effective amounts of at least one additive selected from the group consisting of antioxidants, flame retardants, drip retardants, crystallization nucleators, dyes, pigments, colorants, reinforcing agents, fillers, stabilizers, anti-static agents, plasticizers and lubricants. These additives are known in the art, as are their effective levels and methods of incorporation. Effective amounts of the additives vary widely, but they are usually present in an amount up to about 50% or more by weight, based on the weight of the entire composition.

It was also surprisingly found that a compatibilizing PPE could be diluted with non-functionalized PPE to adjust the viscosity of the blend composition with the polyester resins. This discovery allows for a master batch of functionalized PPE to be prepared and admixed with non-functionalized PPE and compatibilizer compound and polyester resin, in addition to other ingredients, to make a family of similar compositions having a range of viscosities made from common starting materials to meet a variety of end-use requirements for the final compositions.

Additionally, it was discovered that by combining a compatibilizing PPE, and polyester resin, it was possible to obtain a composition that had a marked improvement in chemical resistance to common automotive solvents over comparative compositions wherein the PPE was not appropriately functionalized or was insufficiently functionalized to improve the compatibility between the components. Thus, according to another embodiment of the invention, a compatibilizing PPE is used in combination with a polyester resin to obtain a composition with superior chemical resistance.

The ratio of compatibilizing PPE or mixture of compatibilizing PPE with unfunctionalized PPE to polyester resin can vary from about 99:1 to 1:99, depending on the various property requirements that the composition must meet. The resulting compositions may exhibit either a matrix phase of PPE having polyester particles dispersed therein or a matrix of polyester having PPE particles dispersed therein. For compositions having a continuous phase of polyester, the preferred ranges are generally from about 1–60% by weight of the compatibilizing PPE or mixture of compatibilizing PPE with non-functionalized PPE, and about 99–40% by weight of the polyester resin. The most preferred range is generally from about 10–40% by weight of compatibilizing PPE or mixture of nucleophilic containing PPE with non-functionalized PPE and about 90–60% by weight of the polyester resin. The preferred range of the compatibilizing PPE to non-functionalized PPE generally depends, among other factors, on the number of reactive species per molecule of compatibilizer compound used to make the compatibilizing PPE, the reactivity between the reactive groups on the PPE and the reactive groups on the polyester and the degree of compatibilization that is desired between the various components. For compositions having a continuous phase of the PPE, the ratios of PPE and polyester given above can be inverted. One of ordinary skill in the art will be able to optimize the amount components required based on the intended physical properties desired without undue additional experimentation.

Compatibilized PPE-polyester blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be premixed with each other or with one of the primary polymer components, PPE and polyester resin. It appears that certain properties, such as impact strength and elongation, are sometimes enhanced by initially premixing the PPE with at least one of the typical agents used to prepare a compatibilizing PPE prior to blending with the polyester resin. For example, PPE, graftable orthoester, radical initiator and lubricant can be fed to a screw extruder in which the temperature and mixing regime in the first few barrel segments are suitable to facilitate efficient grafting of orthoester functionality to the PPE. The polyester and additives (optionally in the form of a concentrate) may be fed to the same extruder at an appropriate down-stream feed pox The extruder optionally may be vacuum-vented at barrel segments before the polyester feed port or after the polyester feed port or at both locations. Optionally, a portion of the polyester, additives, or various combinations of the two may be throat fed with the PPE and orthoester monomer.

Depending on the type of agent utilized to make the compatibilizing PPE, some compatibilizing PPE are best made in solution while others are suitable for melt functionalization of the PPE. One of ordinary skill in the art can decide which process is best for the preparation of the compatibilizing PPE based on a number of factors, such as thermal stability of the reactive groups, reaction by-products and equipment options, without undue experimentation.

For melt functionalization reactions, separate extruders may be used in the processing with the polyester resin. Alternatively, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

The compositions of the present invention are essentially free of other thermoplastic resins such as, for example, polycarbonates, polyamides, polyetherimides, and polysulfones. It should also be clear that improved molded articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated.

EXAMPLES

The compositions of the present invention are typically extruded on a twin-screw extruder at a temperature of about 290°–340° C. with a vacuum of 10–20 inches Hg applied to the melt during compounding. The resultant compositions are typically molded using an injection molding machine using a temperature set of about 300°–320° C. and a mold temperature of about 120°–150° C. Molded samples of the compositions are typically subjected to measurement of Izod impact strength according to ASTM D256 (employing a sample size of 2.5 inch by 0.5 inch by 0.125 inch), and tensile yield and tensile elongation at break according to ASTM D638.

The materials used in the following compositions in Tables 1 and 2 were as follows:

PPE is poly(2,6-dimethylphenylene ether) resin having an intrinsic viscosity of about 0.41 dl/gm measured in chloroform at 25° C., obtained from GE Plastics.

PPE-EP is an epoxy functionalized PPE prepared by reacting PPE with about 4% by weight 2-chloro-4-(2, 4,6-trimethylphenoxy)-6-glycidoxy-1,3,5-triazine (MGCC.).

PPE-OE is an ortho ester functionalized PPE prepared by extruding by weight acrylate ortho ester (VII) with PPE. The PPE-OE was dried at about 110° C. prior to use.

BF-E is (polyethylene-co-12% glycidyl methacrylate) obtained under the trademark BONDFAST E from the Sumitomo Chemical Co., Ltd.

IM is a styrene-(ethylene-butylene)-styrene type impact modifier obtained from the Shell Chemical Co. under the trademark KRATON as grade G1651.

PBT is a poly(butylene terephthalate) resin having an I.V. of about 1.17 as measured in a 1:1 weight to weight mixture of phenol:1,1,2,2-tetrachloroethane at 30° C. and having an acid endgroup concentration of about 46 µeq/g and a Tg of about 40°–45° C. and a Tm of about 225° C.

PET is a poly(ethylene terephthalate) resin having an I.V. of about 0.72 as measured in a 1:1 weight to weight mixture of phenol:1,1,2,2-tetrachloroethane at 30° C. and having an acid endgroup concentration of about 20 µeq/g and a Tg of about 70°–75° C. and a Tm of about 265° C.

PEN is a poly(ethylene naphthalate) resin having an I.V. of about 0.75 as measured in a 1:1 weight to weight mixture of phenol:1,1,2,2-tetrachloroethane at 30° C. and having an acid endgroup concentration of about 11 µeq/g and a Tg of about 120°–129° C. and a Tm of about 265° C.

PBN is a poly(butylene naphthalate) resin having an I.V. of about 0.75 as measured in a 1:1 weight to weight mixture of phenol, 1,2,2-tetrachloroethane at 30° C. and having an acid endgroup concentration of about 10 µeq/g and a Tg of about 80°–85° C. and a Tm of about 243° C.

Tables 1 and 2 contain illustrative examples of blends containing PPE, and various polyesters optionally, further comprising at least one impact modifier (IM and BF-E).

compatibilizing PPE. Additionally, compatibilized blends PPE/PEN can be toughened with certain rubbery modifiers.

Figure 1:
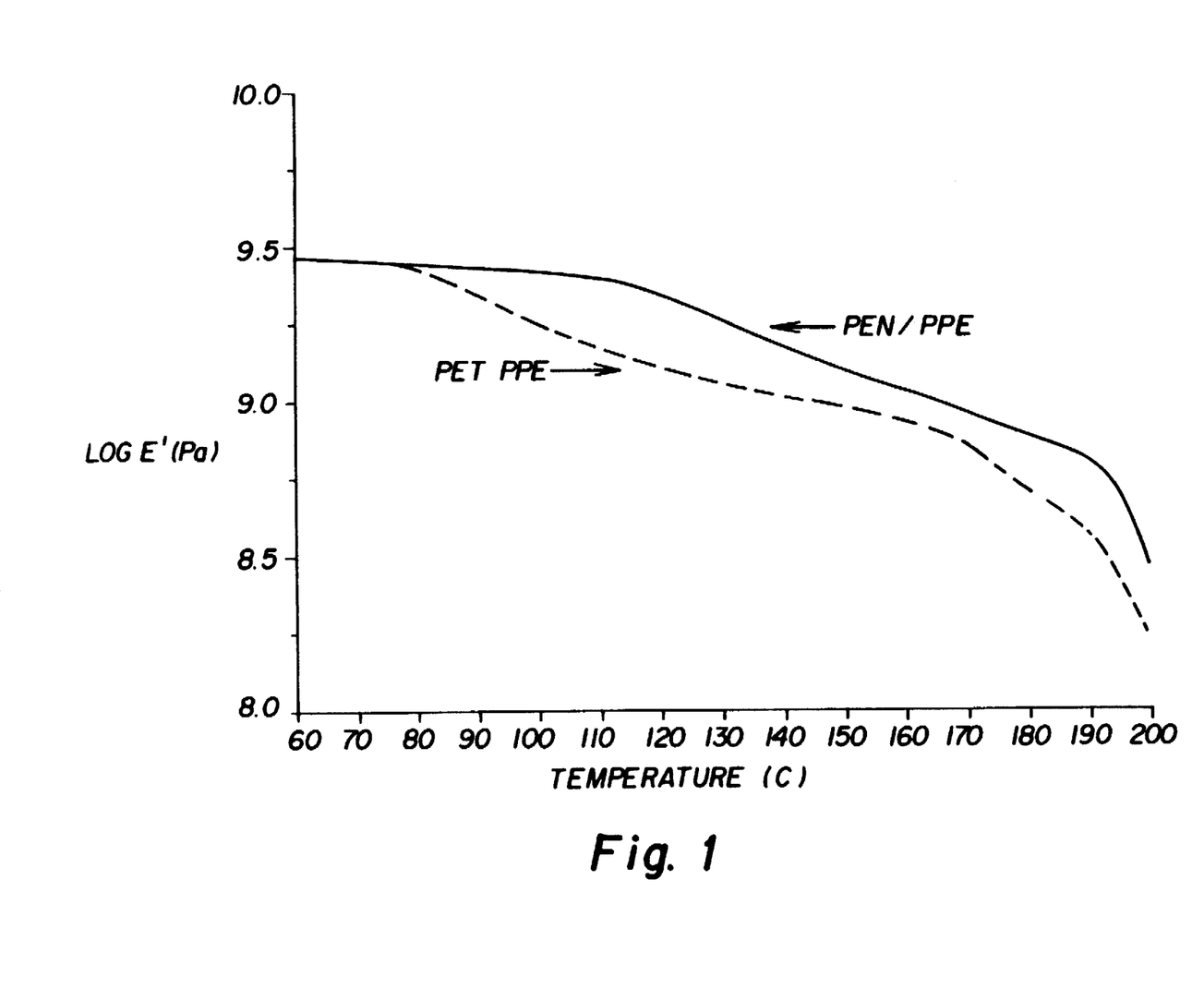
FIG. 1 is a dynamic mechanical analysis generated over a temperature range of about 60° C. to about 200° C. at a 2° C./minute heating rate and a 1 Hz frequency illustrating a comparison of Samples 1 and 4 comprising PPE and polyester comparing PEN to PET.
Figure 2:
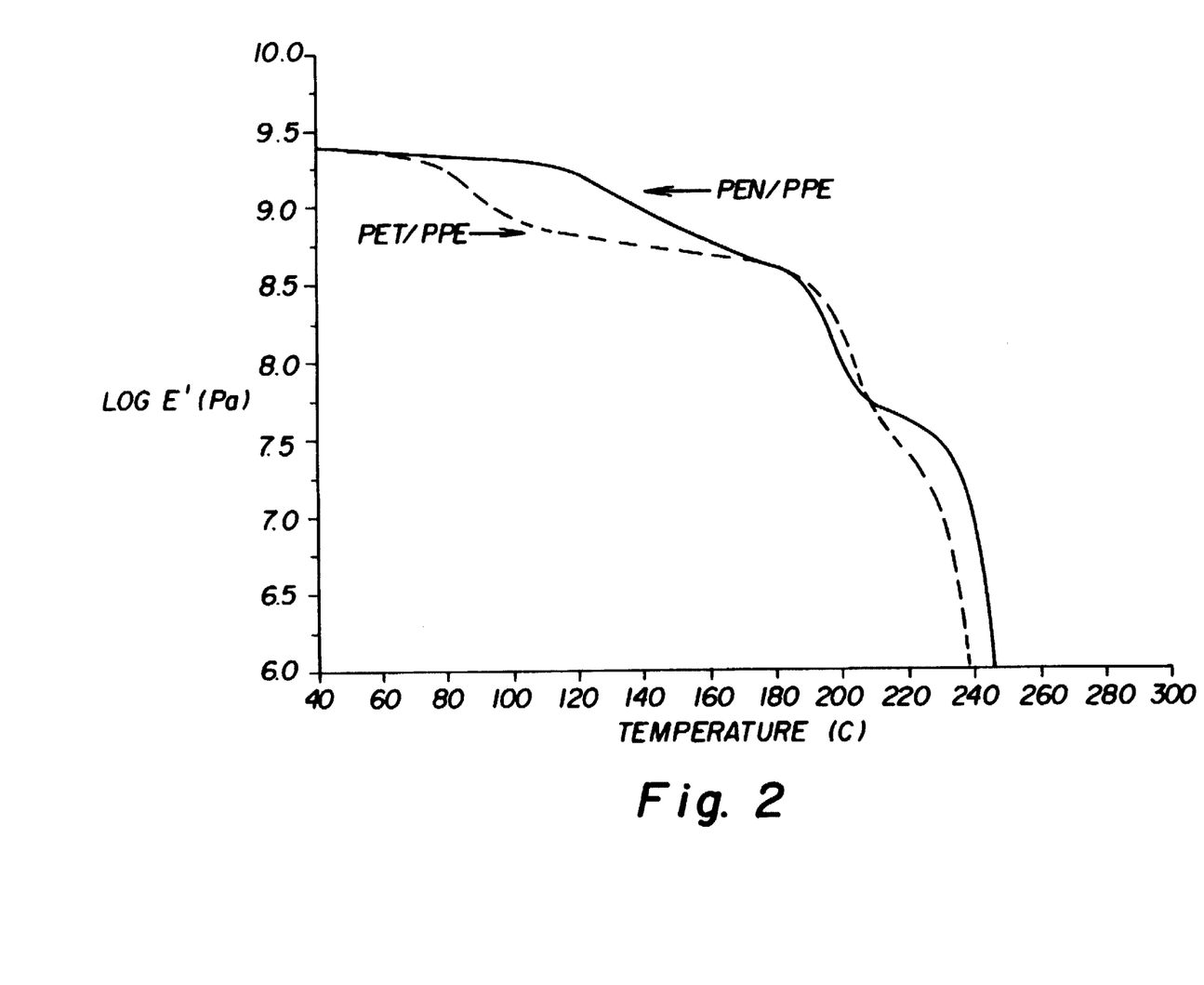
FIG. 2 is a dynamic mechanical analysis generated over a temperature range of about 40° C. to about 240° C. at a 2° C./minute heating rate and a 1 Hz frequency illustrating a comparison of Samples 2 and 5 comprising a compatibilizing PPE, polyester, and a S-EB-S triblock elastomer comparing PEN to PET.
Figure 3:
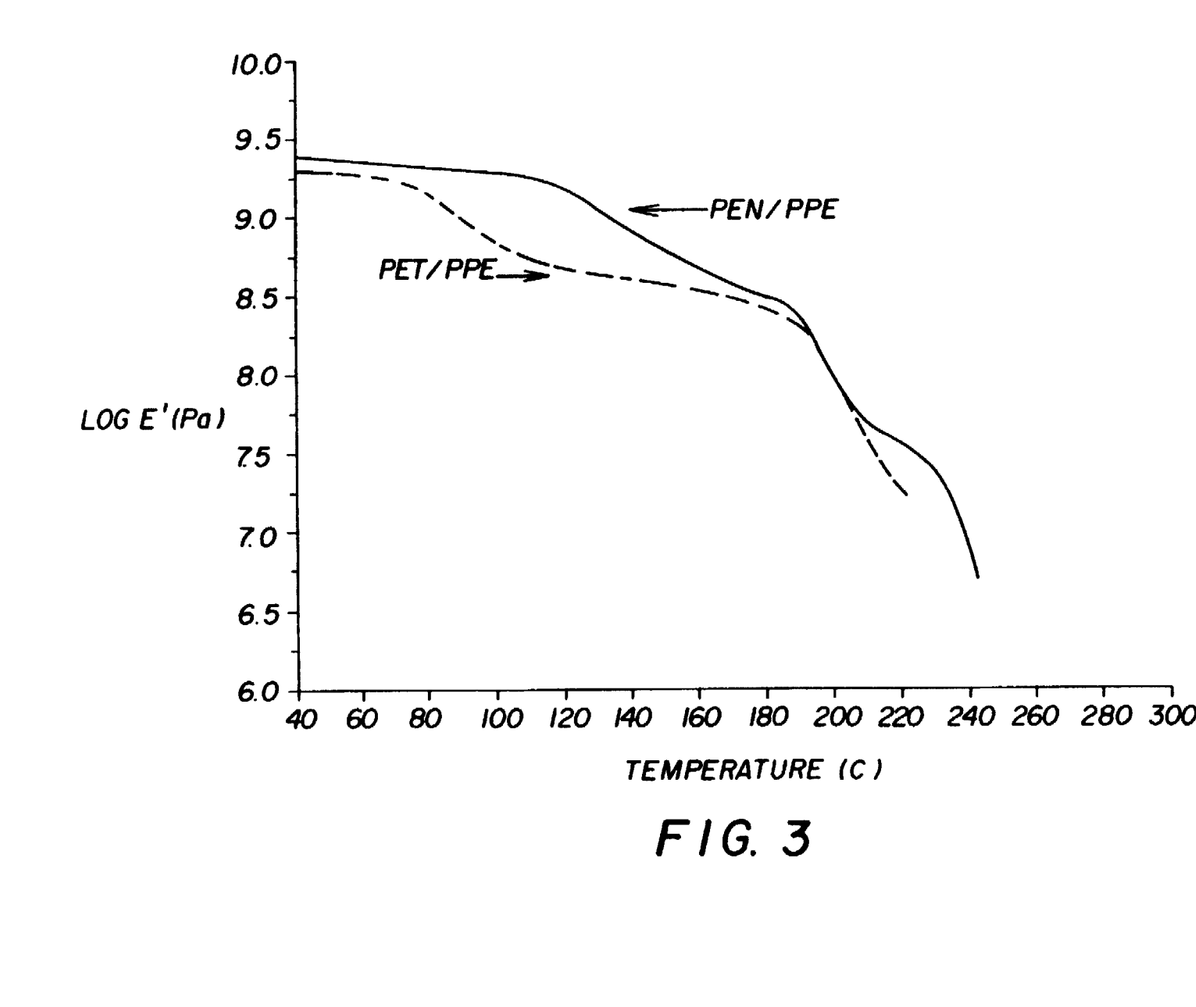
FIG. 3 is a dynamic mechanical analysis generated over a temperature range of about 40° C. to about 240° C. at a 2° C./minute heating rate and a 1 Hz frequency illustrating a comparison of Samples 3 and 6 comprising a compatibilizing PPE, polyester, a S-EB-S triblock elastomer, and a functionalized olefinic elastomer comparing PEN to PET.

FIGS. 1, 2, and 3 are dynamic mechanical analysis (DMA) of PPE/polyester compositions illustrating the elastic modulus as a function of temperature. The DMA data were generated over a temperature range of from about 40° to 60° C. up to about 200° to 240° C. at a 2° C. heating rate and a 1 Hz frequency.

FIG. 1 illustrates a comparison of blends comprising PPE and a polyester comparing PET to PEN and correspond to samples 1 and 4. As seen by the data, the drop in the elastic modulus for the PET containing blend is at about 75° to 80° C. The drop in the elastic modulus for the PEN containing blend is at about 110° to 120° C. More surprisingly, the blend containing the PEN has an elevated modulus up to 200° C. whereas the blend containing the PET has a modulus plateau between about 100° C. and 200° C. and remains lower than the modulus of the blend containing the PEN up through the full temperature range tested. The expected result for the PEN blend would be for the elastic modulus to drop off to the same level as observed for the PET blend.

FIG. 2 illustrates a comparison of blends 2 and 5 comprising a compatibilizing PPE, polyester, and a S-EB-S triblock elastomer comparing PEN to PET. As seen by the data, the drop in the elastic modulus for the PET containing blend is at about 80° C. The drop in the elastic modulus for the PEN containing blend is at about 120° C. Also unex-

TABLE 1

| sample: | 1 | 2 | 3 | 4 | 5 | 6 | 7 |
|---|---|---|---|---|---|---|---|
| PPE | 37 | 0 | 0 | 40 | 0 | 0 | 0 |
| PPE-EP | 0 | 32.5 | 32.5 | 0 | 36 | 36 | 0 |
| PPE-OE | 0 | 0 | 0 | 0 | 0 | 0 | 36 |
| BF-E | 0 | 0 | 7.5 | 0 | 0 | 7 | 0 |
| IM | 0 | 12.5 | 5 | 0 | 10 | 5 | 10 |
| PET | 63 | 55 | 32.5 | 0 | 0 | 0 | 0 |
| PEN | 0 | 0 | 0 | 60 | 54 | 54 | 54 |
| notched Izod; ft-lb/in | 0.2 | 1.7 | 3.5 | 0.16 | 0.71 | 4.5 | 0.58 |
| unnotched Izod; ft-lb/in | — | — | — | 1.4 | 2.6 | NB | 3.3 |
| tensile strength, psi | 6302 | 5800 | 5600 | 5709 | 7552 | 6449 | 8008 |
| ultimate elongation; % | 4 B | 24 D | 28 D | 4.5 B | 21 D | 121 D | 15 D |

D is ductile; B is brittle.

As seen by Table 1, samples 1–3 are control blends made with PET. Sample 1 is a blend of PET and unfunctionalized PPE. Samples 2 and 3 are PET / PPE blends wherein the PPE is an epoxy functionalized PPE. Samples 2 and 3 additionally contain elastomer components. Sample 2 contains a S-EB-S triblock elastomer and sample 3 contains a mixture of S-EB-S triblock elastomer and an epoxy-functionalized elastomer. Samples 4–7 are blends of PPE and PEN. Sample 4 is a control blend made with unfunctionalized PPE. Samples 5 and 6 are blends of compatibilizing PPE (in these examples epoxy functionalized PPE), PEN, and impact modifiers. Sample 5 contains a S-EB-S triblock elastomer and sample 6 contains a mixture of S-EB-S triblock elastomer and an epoxy-functionalized elastomer. Sample 7 illustrates the use of an orthoester functionalized PPE as the compatibilizing PPE in a blend of PEN and a S-EB-S triblock elastomer. As seen by these data showing improvements in tensile and impact properties, compatibilized blends of PPE and PEN can be made through the use of a pectedly, the blend containing the PEN has an elevated modulus up to 200° C. whereas the blend containing the PET has a modulus plateau between about 100° C. and 200° C. which is lower than the elastic modulus of the PEN blend. The expected result is for the PEN blend to have an elastic modulus which drops off to the same level as observed for the PET blend.

FIG. 3 illustrates a comparison of blends 3 and 6 comprising a compatibilizing PPE, polyester, a S-EB-S triblock elastomer, and a functionalized olefinic elastomer comparing PEN to PET. Results similar to those described for FIGS. 1 and 2 were also obtained with the blend containing the PEN having a broader high temperature range over the PET blend. The increased elastic modulus seen in the blends containing the PEN is especially desirable for applications requiring high temperature resistance.

TABLE 2

| sample: | 8 | 9 | 10 | 11 | 12 | 13 | 14 |
|---|---|---|---|---|---|---|---|
| PPE | 36 | 0 | 0 | 40 | 0 | 0 | 0 |
| PPE-EP | 0 | 36 | 35 | 0 | 36 | 36 | 0 |
| PPE-OE | 0 | 0 | 0 | 0 | 0 | 0 | 36 |
| BF-E | 0 | 0 | 7 | 0 | 0 | 7 | 0 |
| IM | 0 | 10 | 5 | 0 | 10 | 5 | 10 |
| PBT | 54 | 54 | 53 | 0 | 0 | 0 | 0 |
| PBN | 0 | 0 | 0 | 60 | 54 | 54 | 54 |
| notched Izod; ft-lb/in | 0.2 | 3.0 | 2.8 | 0.25 | 0.58 | 4.60 | 1.70 |
| unnotched Izod; ft-lb/in | — | — | — | 1.7 | 6.0 | 11.5 | 2.2 |
| tensile strength; psi | 3846 | 6989 | 6720 | 4338 | 7207 | 6622 | 5174 |
| ultimate elongation; % | 7 | 56 | 53 | 3.7 | 17 | 14 | 6 |

As seen by Table 2, sample 8–10 are control blends made with PBT. Sample 8 is a blend of PBT and unfunctionalized PPE. Samples 9 and 10 are PBT / PPE blends wherein the PPE is an epoxy functionalized PPE. Samples 9 and 10 additionally contain elastomer components. Sample 9 contains a S-EB-S triblock elastomer and sample 10 contains a mixture of S-EB-S triblock elastomer and an epoxy-functionalized elastomer. Samples 11–14 are blends of PPE and PBN. Sample 11 is a control blend made with unfunctionalized PPE. Samples 12 and 13 are blends of compatibilizing PPE (in these examples epoxy functionalized PPE), PBN, and impact modifiers. Sample 12 contains a S-EB-S triblock elastomer and sample 13 contains a mixture of S-EB-S triblock elastomer and an epoxy-functionalized elastomer. Sample 14 illustrates the use of an orthoester functionalized PPE as the compatibilizing PPE in a blend of PBN and a S-EB-S triblock elastomer. As seen by these data showing improvements in tensile and impact properties, compatibilized blends of PPE and PBN can be made through the use of a compatibilizing PPE. Additionally, compatibilized blends PPE/PBN can be toughened with certain rubbery modifiers.

What is claimed:

1. A composition comprising:

(a) a poly(phenylene ether) resin, and (b) a polyester resin of the formula wherein each $R^1$ is independently a divalent aliphatic, alicyclic, or aromatic hydrocarbon or polyoxyalkylene radical, or mixtures thereof and each $A^1$ is independently a divalent aliphatic, alicyclic or aromatic radical, or mixtures thereof; with the proviso that at least about 50 mole percent of the $A^1$ are naphthalate radicals.

2. The composition of claim 1, wherein the poly(phenylene ether) resin comprises a compatibilizing poly(phenylene ether) resin.

3. The composition of claim 2, wherein the polyester resin containing naphthalate radicals has a glass transition temperature and a melting point temperature which are greater than a polyester resin containing less than about 50 mole percent naphthalate radicals.

4. The composition of claim 3, wherein in the polyester resin at least 50 mole percent of the $A^1$ radicals are naphthalate radicals.

5. The composition of claim 4, wherein in the polyester resin at least 90 mole percent of the $A^1$ radicals are naphthalate radicals.

6. The composition of claim 5, wherein the polyester resin is a poly(alkylene naphthalate) resin.

7. The composition of claim 6, wherein the polyester resin is a poly(1,2-ethylene-2,6-naphthalate) resin, poly(1,4-butylene-2,6-naphthalate) resin, poly(1,4-cyclohexanedimethanol-2,6-naphthalate) resin, or mixtures thereof.

8. The composition of claim 2, wherein the compatibilizing poly(phenylene ether) resin comprises an epoxy moiety, an orthoester moiety, or a mixture of an epoxy moiety and an orthoester moiety.

9. The composition of claim 3, further containing a drop in elastic modulus which occurs at least about 15° C. higher than the corresponding composition wherein the polyester resin contains less than about 50 mole percent naphthalate radicals.

10. The composition of claim 9, wherein the drop in the elastic modulus occurs at least about 25° C. higher than the corresponding blend wherein the polyester does not contain a substantial portion of naphthalate moieties.

11. The composition of claim 1, further comprising at least one additional component selected from the group consisting of impact modifiers, anti-oxidants, flame retardants, drip retardants, crystallization nucleators, dyes, pigments, colorants, reinforcing agents, fillers, stabilizers, antistatic agents, plasticizers and lubricants.

12. The composition of claim 1, wherein based on the total weight of the composition, the poly(phenylene ether) resin is present from about 1% to about 99% by weight and the polyester resin is present from about 99% to about 1% by weight.

13. The composition of claim 12, wherein the polyester resin is present as the continuous phase.

14. A composition consisting essentially of:

(a) a poly(phenylene ether) resin;

(b) a polyester resin of the formula wherein each $R^1$ is independently a divalent aliphatic, alicyclic, or aromatic hydrocarbon or polyoxyalkylene radical, or mixtures thereof and each $A^1$ is independently a divalent aliphatic, alicyclic or aromatic radical, or mixtures thereof; with the proviso that at least about 50 mole percent of the $A^1$ moieties are naphthalate radicals; and (c) optionally, at least one additional component selected from the group consisting of impact modifiers, antioxidants, flame retardants, drip retardants, crystallization nucleators, dyes, pigments, colorants, reinforcing agents, fillers, stabilizers, antistatic agents, plasticizers and lubricants.

* * * * *